United States Patent
McPherson

[15] 3,647,207
[45] Mar. 7, 1972

[54] SHEET-FEEDING MECHANISM CENTERING DEVICE

[72] Inventor: Donald F. McPherson, Hilton, N.Y.
[73] Assignee: Xerox Corporation, Stamford, Conn.
[22] Filed: May 18, 1970
[21] Appl. No.: 38,465

[52] U.S. Cl................................................271/61, 271/36
[51] Int. Cl...............................................................B65h 1/04
[58] Field of Search.........................271/61, 36, 59, 58

[56] References Cited

UNITED STATES PATENTS

| | | |
|---|---|---|
| 2,558,046 | 6/1951 | Geib.............................................271/61 X |
| 3,367,487 | 2/1968 | Dwyer..........................................271/61 X |
| 2,660,431 | 11/1953 | Levin...........................................271/61 X |
| 3,210,071 | 10/1965 | Rogers et al..................................271/21 |

Primary Examiner—Joseph Wegbreit
Assistant Examiner—Bruce H. Stoner, Jr.
Attorney—James J. Ralabate, Donald F. Daley and Thomas J. Wall

[57] ABSTRACT

Apparatus for reliably locating the feed rollers and paper snubbers of a copier about the centerline of sheets contained in a cassette in response to the cassette being loaded into the copier regardless of the size of the cassette so that the feeding mechanism feeds sheets as needed from the cassette to the copier in correct alignment.

4 Claims, 4 Drawing Figures

INVENTOR.
DONALD F. MC PHERSON

BY *(signature)*

ATTORNEY

SHEET-FEEDING MECHANISM CENTERING DEVICE

BACKGROUND OF THE INVENTION

This invention relates to loading a cassette containing sheet material into a copier, and more particularly, to an apparatus for locating the feed rollers and paper snubbers of a sheet-feeding mechanism about the centerline of the cassette in response to the cassette being loaded into the copier.

In copiers widely used in business offices, the paper or other material upon which a copy is made is generally provided in sheets of predetermined size which are fed through the copier one at a time to be processed. Since copies can be made in quick succession, it has been found advantageous to place a stack of sheets in a sheet-feeding mechanism and automatically feed the sheets one at a time from the stack into the copier as the copier requires them. When such a sheet-feeding mechanism is used, the operator of the copier need not be concerned with supplying new sheets to the copier until the stack is depleted or the size of the sheet is to be changed.

A problem often encountered in loading a stack of sheets into a copier is that the sheet size requirement of the copier may change from time to time necessitating that the entire stack be removed from the copier and be replaced by another stack of different size. When the sheet supply is maintained in a loose pile which is simply placed into a tray or other container in the copier, the changing of the paper size can be a difficult and unmanageable task since the sheets in the stack may become disarranged and their edges bent or torn as the stack is loaded and unloaded from the machine.

One method of keeping the stack of sheets in perfect alignment during loading and unloading is to place sheets in a sheet container or cassette which can be removed from the copier. The cassette can be made of an inexpensive material such as, heavy paper, plastic, cardboard, metal, etc., and can be handled quite easily by the operator. When the cassette is used to hold the sheets, the operator need only handle the cassette to change the size of paper and refill the paper supply in the copier. The cassette prevents the sheets in the stack from becoming disarranged and prevents contact between the edges of the sheets and external hard objects which may bend or tear the sheets.

In a feeding mechanism having one or a plurality of feed rollers to feed the sheets from the cassette to the copier, the location of the rollers is very important. For instance, in a feeding system utilizing two feed rollers which are spaced apart, the rollers should be placed about the centerline of the sheet in the cassette to be certain that the sheets are fed in proper alignment. The "centerline" in this case is the portion of the sheet running parallel to the direction in which the sheet is fed midway between the two edges of the sheet which is parallel to the direction in which the sheet is fed. It has been found that when the feed rollers are not centered, the sheets tend to become misaligned and cause paper jams on their way through the copier. When properly centered rollers are used to feed the sheets, however, the sheets are fed from the cassette in proper alignment and there is very little chance of paper jams due to the feed rollers.

In order to place a cassette in the feeding mechanism without damaging the edges of sheets in the cassette, the feed rollers and paper snubbers should be lifted away from the leading edge of the cassette until it is fully loaded into the copier. As a result of this movement, the exact location of the feed rollers relative to the cassette will most likely be modified every time a new cassette is placed in the feeding mechanism. To be certain that the feed rollers are centered at all time, it is best to relocate the feed rollers about the centerline of the cassette as the feeding mechanism engages the sheets in the cassette.

Centering the feed rollers is not a particularly difficult task when the cassette being placed in the copier is the same size as that previously in the copier. However, when a different size cassette, and, hence, a different size sheet, is being placed in the copier, the feed rollers must be relocated to be certain that they act about the centerline of the new size sheets and feed the sheets to the copier in proper alignment. In prior art feeding devices, the operator of the copier had to remember to manually relocate the feeding mechanism to the centerline of the sheet before starting the machine. If the operator neglected to do this and the feeding mechanism did not act about the centerline of the sheets, it was very likely that paper jams would occur due to the sheets being twisted by the feeding mechanism as they were fed from the cassette.

The apparatus described herein is a device for automatically centering the feed rollers and paper snubbers of a sheet-feeding mechanism in response to inserting a cassette of sheets into the copier. The apparatus is designed so that the operator of the copier need not worry about the position of the feed rollers and snubbers because proper alignment is achieved in response to the size of the cassette placed in the copier.

Accordingly, it is an object of the present invention to improve apparatus for loading a sheet cassette into a copier.

It is another object of the invention to align the feed rollers and paper snubbers of a feeding mechanism about the centerline of a sheet cassette as it is loaded into the copier.

It is another object of the invention to automatically position feed rollers and paper snubbers as a sheet cassette is loaded in a copier so that sheets are fed from the cassette to the copier in proper alignment.

SUMMARY

The invention disclosed herein is an apparatus for positioning the feed rollers and paper snubbers of a copier about the centerline of a sheet cassette in response to the cassette being loaded into the copier. The cassette is placed in the copier by sliding it on a support member while a first of its two sides moves against a frame member. A movable locator plate is adjusted to enable the cassette to slide on the support between it and frame member and is biased against the second side of the cassette. The feed rollers and paper snubbers move in the same direction half the distance of the locator plate through a cord and pulley arrangement connecting the two. Since the locator plate is positioned at a distance which is equivalent to the full width of the cassette as measured from the frame member, the feed rollers and paper snubbers are automatically positioned about the centerline of the cassette regardless of the width of the cassette.

BRIEF DESCRIPTION OF THE DRAWINGS

For a better understanding of the invention as well as other objects and further features thereof, reference is had to the following description of the invention to be used in conjunction with the accompanying drawings.

DESCRIPTION OF THE PREFERRED EMBODIMENTS

The present invention can be used in any apparatus wherein the cassette containing sheets of paper or the like is inserted into a feeding mechanism adapted to feed the sheets from the cassette to a work station. The invention is particularly described herein as part of a xerographic copier which receives the sheets one at a time from the cassette for processing into a copy.

Figure 1:
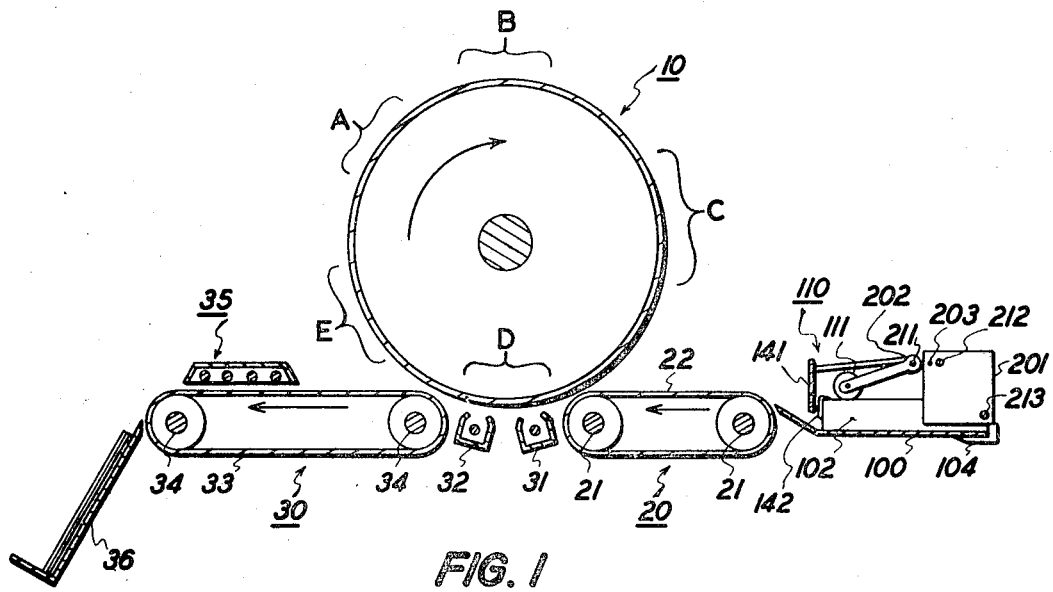
FIG. 1 is a schematic view of the invention in a xerographic copier.

FIG. 1 is a schematic illustration of a xerographic copier employing the invention. A reusable photoconductive drum 10 is rotated through a number of processing stations in the direction shown by the arrow to produce a toner image of the information to be reproduced. The drum passes through charging station A where a uniform electrostatic charge is placed on its photoconductive surface, and then through exposure station B where a light image conforming to the information to be reproduced is focused on the charged surface of the drum in synchronism with the movement thereof. The charge in the areas of the drum struck by the light areas of the light image is dissipated while the charge on the remaining areas remains relatively unaffected by the light. The resulting charge pattern on the drum produces a latent electrostatic image on the surface of the drum conforming to the light image of the information to be reproduced. The latent image then passes through developing station C where a powder material is applied to the surface of the drum to develop the image. The powder applied in station C adheres to the image areas of the charged pattern to form a toner image on the surface of the drum.

Next, the drum passes through transfer station D where the toner image is electrostatically transferred to a copy sheet. A copy sheet is fed from cassette 102 to conveyor mechanism 20 by feeding mechanism 110 having feed rollers 111 working in conjunction with paper snubbers 142. The portion of the machine frame adjacent the cassette is eliminated from FIG. 1 to show selected elements of the invention. The operation of the feeding mechanism is described in more detail below. The top sheet in the cassette is fed onto conveyor mechanism 20 which moves it into the transfer station. Conveyor mechanism 20 includes an endless movable belt 22 supported and driven by rollers 21 in a counterclockwise direction. As the leading edge of the sheet is fed onto belt 22 by feeding mechanism 110, the belt moves the sheet out of the cassette and into transfer station D in synchronism with the movement of the toner image on the surface of drum 10.

The toner image on the drum is electrostatically attracted to the copy sheet in station D by any suitable device such as a corona charging device 31. Any charge placed on the sheet by device 31 is then neutralized by charging device 32 enabling the sheet to fall onto conveyor mechanism 30. Conveyor mechanism 30 has an endless belt 33 supported and driven in a counterclockwise direction by rollers 34. Belt 33 brings the copy sheet under fuser 35 which fixes the toner image to the copy sheet. The copy sheet now having a fixed toner image falls into storage tray where it remains until removed by the operator of the copier. After the toner image is transferred to the copy sheet at station D, the drum rotates through cleaning station E where any residual toner image on the drum surface is removed in preparation for the next cycle.

In order to provide copy sheets to the copier as needed, a sheet cassette 102 is located adjacent feeding mechanism 110. The cassette is manually loaded into the copier by the operator of the machine. The operator places the leading edge of the cassette onto support 100 and then slides the cassette towards the feeding mechanism 110 until it reaches its fully loaded position shown in FIG. 1. In order to place the leading edge of the cassette on support 100 and enable it to slide freely along the support 100, bar 104, which is linked to the feeding mechanism 110 through a linkage described in my copending application, Ser. No. 38,466, filed on May 18, 1970, is depressed by the bottom of the cassette to assume a position level with the support. Bar 104 is biased to a position above support 100, a position which places the feeding mechanism 110 in an operative position; that is, feed rollers 111 and paper snubbers 142 engage the sheets in the cassette 102. When the bar is depressed by the presence of the cassette on the support 100, feed rollers 111 and paper snubbers 142 are brought to an inoperative position remote from the path of the sliding cassette to avoid any damage to the sheets in the cassette. In addition to depressing bar 104, locator plate 201 must be moved towards the observer to FIG. 1 to allow the entire width of the cassette to be placed on support 100. The significance of locator plate 201 is described below.

Figure 2:
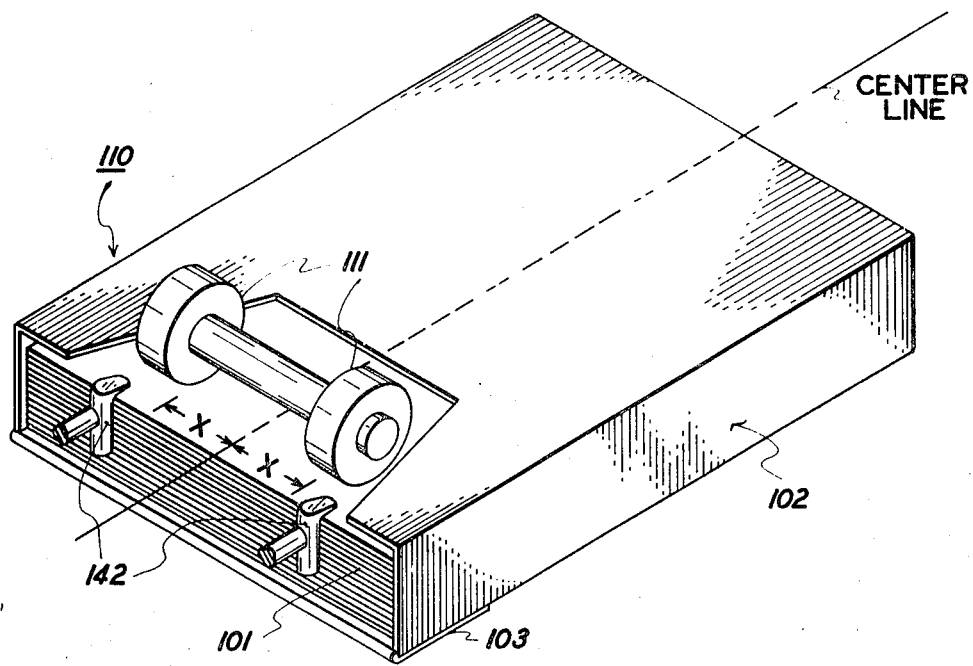
FIG. 2 is a schematic view of the sheet cassette with the feed rollers and paper snubbers located about the centerline of the cassette.

FIG. 2 is a more detailed view of the cassette and parts of the feeding mechanism which engage the sheets in the cassette. The cassette can be made of any suitable material; for instance, cardboard, plastic, stiff paper, metal, etc. The cassette has a flap portion 103 which is normally closed while the cassette is in storage to prevent dust and other foreign matter from contacting the sheets. The flap opens to the position shown in FIG. 2 before the cassette is loaded into the machine so that the sheets can be fed from it. To prepare the cassette for loading, the flap is rotated to the bottom of the cassette thereby exposing the leading edges of sheets 101. The operator places the leading edge of the cassette, flap down, on support 100 and slides it to its fully loaded position.

The position of feed rollers and paper snubbers relative to the cassette is shown in FIG. 2 at a time when the cassette is fully loaded into the copier. Once the sheets are engaged by the feed rollers and paper snubbers, feeding of sheets from the cassette is carried out as follows.

The feed rollers 111 rest on the top sheet in the stack while the paper snubbers 142 rest on the top sheet as well as along the leading edge of the stack. To begin the feeding operation, the paper snubbers move up so that the top sheet can move relative to the rest of the stack. As the snubbers move up, the feed rollers rotate in the counterclockwise direction driving only the top sheet in the stack far enough back so that its leading edge is out from under the snubbers. The snubbers then drop onto the second sheet in the stack and clamp it securely so that it cannot move. After the snubbers grip the second sheet, the feed rollers rotate in the clockwise direction feeding the top sheet over the snubbers and towards the transfer station of the copier. After the top sheet has been fed completely out of the cassette, the next sheet in the stack becomes the top sheet and the cycle is repeated to feed it to the transfer station.

It has been found advantageous to locate feed rollers 111 about the centerline of the sheets in the stack to assure proper alignment of the sheets as they are fed from the cassette. If the feed rollers were not positioned about the centerline, the sheets would be twisted by the feeding mechanism and cause paper jam problems in the copier. For instance, in the feeding device shown in FIG. 2, two feed rollers 111 are located so that each roller is an equal distance "X" from the centerline of the top sheet. The distance "X" is arbitrary for the purposes of this description, however, when the feed rollers are located about the centerline of the stack as shown, proper alignment of the sheets during feeding is assured.

It can be seen in FIG. 1 that feed rollers 111 and paper snubbers 142 are supported by frame 141 and are held against the top sheet in the stack by the force of gravity, or any suitable biasing mechanism. A movable locator plate 201 is biased against one side of cassette 102. The locator plate is supported for movement on rods 212 and 213, which, in turn are attached to the machine frame. The purpose of locator plate 201 is to determine the location of feeding mechanism 110 relative to the stack of sheets in cassette 102. Feeding mechanism 110 is connected to rod 211 by arm 202 and the feeding mechanism is supported so that it can slide along rod 211. Cord 203 is attached to the machine frame and also to locator plate 201 by passing around pulley 217 (best seen in FIGS. 3a and 3b) which is attached to the feeding mechanism. Due to this pulley arrangement, the movement of locator plate 201 is reflected in half measure in the movement of feeding mechanism 110.

Figure 3A:
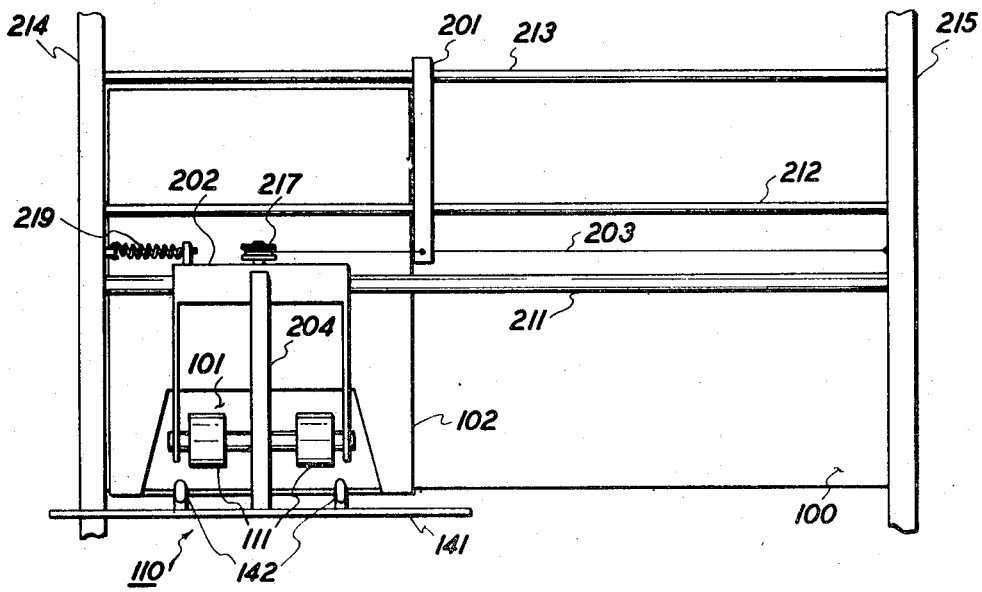
FIGS. 3a and 3b are top views of the invention.
Figure 3B:
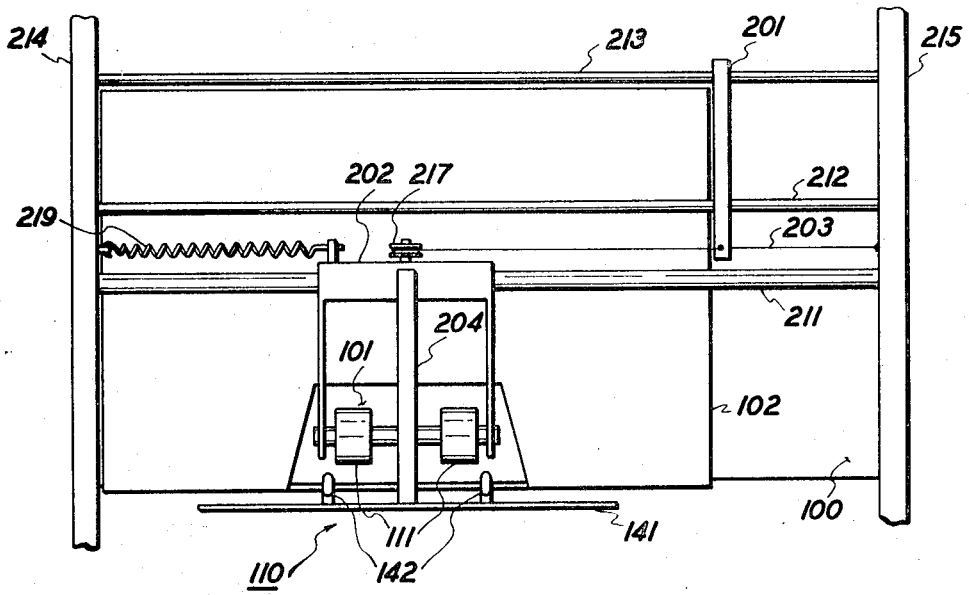

For a more detailed view of the invention, reference is had to FIGS. 3a and 3b which are top views of the centering device. Referring to FIG. 3a, sheets 101 are contained within cassette 102 which rests on support 100. The feeding mechanism 110 includes feed rollers 111 which are supported on slidable bracket 202 and motor 204 located therebetween which is adapted to drive the feed rollers during the feeding operation. In addition, bracket 202 supports frame 141 which contains paper snubbers 142. Frame 141 is adapted to allow sheets fed from the cassette to pass through an opening (not shown) therein and onto the copier.

Bracket 202 is supported for movement along rod 211 and supports pulley 217 upon which cord 203 rides. The centering mechanism also includes movable locator plate 201 which is supported for movement along rods 212 and 213. Rods 211, 212, and 213 are all fixed to the machine frame members 214 and 215. Feeding mechanism bracket 202 is biased to the left or towards machine frame member 214 by any suitable mechanism such as spring 219 which at one end thereof is attached to machine frame member 214, and is attached at the other end thereof to feeding mechanism bracket 202. The action of the spring causes feeding mechanism bracket 202, and the feed rollers 111 and paper snubbers 142, to be biased to the left in FIGS. 3a and 3b.

Cord 203, which is attached to machine frame member 215, winds around pulley 217 on frame 202 and then back to locator plate 201 to which it is attached. Due to this pulley arrangement, for each unit distance locator plate 201 moves in either direction, left or right, the feeding mechanism 110 will move half the unit distance left or right, respectively. Since the distance between machine frame member 214 and the opposite side of the cassette is determined by the position of locator plate 201, feed rollers 111 will be positioned about the centerline of sheets 101 no matter what size cassette is placed in the feeding mechanism, if the cord length is picked correctly. The length of the cord, of course, is ultimately dependent on the location of feed rollers 111 relative to bracket 202 and the distance between machine frame members 214 and 215.

As a cassette of sheets is loaded onto the support 100 shown only in FIG. 1, locator plate 201 must be moved manually towards the right of the cassette to provide sufficient space for the leading edge of the cassette to slide between it and frame member 214 to rest on support 100. Once the leading edge of the cassette is located on the support with one edge against machine frame member 214, locator plate 201 can be released by the operator of the copier and move against the other side of cassette 102 due to the bias placed on bracket 202. In this position, the position of the locator plate places the feed rollers and snubbers about the centerline of the cassette.

Referring to FIG. 3b, if a larger cassette is placed in the feeding mechanism than that shown in FIG. 3a, it can be seen that, due to the position assumed by locator plate 201 against the edge of the cassette, the feed rollers automatically locate themselves about the centerline of the stack of sheets in the cassette 102. By utilizing the invention described herein, any size cassette which can be placed between machine frame members, 214 and 215, can be loaded into the copier with the assurance that the feed rollers and snubbers are properly positioned for feeding sheets from the cassette to the copier in correct alignment.

In addition to the apparatus outline above, many other modifications and/or additions to this invention will be readily apparent to those skilled in the art upon reading this disclosure, and these are intended to be encompassed within the invention disclosed and claimed herein.

What is claimed is:

1. Apparatus for engaging sheets, or the like, in a cassette with the feeding mechanism of a copier as the cassette is being loaded into a copier so that the sheets are feedable from the cassette to the copier without misalignment comprising:

first and second copier frame members which are spaced apart, the first frame adapted to guide one side of the cassette as it is being loaded into the copier, cassette support means attached to the copier between the first and second frame members having a feeding end adjacent the feeding mechanism and an open end external to the copier, the support means adapted to enable the leading portion of the cassette to slide from its open end to its feeding end, slidable bracket means to enable the feeding mechanism to move in substantially a transverse direction relative to the direction in which the sheets are advanced from the cassette to the copier, a locator plate supported for movement in substantially a parallel direction relative to the direction of movement of the feeding mechanism, connecting means for attaching the bracket means to the second frame member so as to enable the bracket means to move one unit distance for each two units of distance the locator plate moves, and biasing means for resiliently urging the bracket means toward the first frame member whereby the locator plate engages the side portion of the cassette opposed from the second frame member when the cassette is loaded into the copier so that the slidable bracket means moves the feeding mechanism to feedably engage the sheets in the cassette at about the centerline of the cassette.

2. The apparatus in claim 1 wherein the connecting means between the locator plate and bracket means is a cord having one end attached to the locator plate and the other end attached to the second frame member, and further including, a pulley means attached to the bracket means adapted to feedably engage the portion of the cord between the locator plate and the second frame member whereby the bracket means moves in response to movement of the locator plate.

3. Apparatus for centering a pair of feed rollers in a copier about the centerline of sheets in the cassette, the cassette located between first and second copier frame members which are spaced apart at and one side thereof contacting the first frame member, in preparation for feeding sheets from the cassette to the copier in a path parallel to the first frame member, comprising:

feed roller support means enabling the feed rollers to move perpendicular to the direction in which the sheets are fed from the cassette, and means to locate the feed rollers about the centerline of the sheets in the cassette including:

i. a locator plate supported for movement in the direction parallel to the feed rollers and adapted to be positioned on the side of the cassette nearest the second frame member, ii. pulley means on the feed roller support means, and iii. a cord connected between the locator plate and the second frame member which is feedably engaged with the pulley, the length of the cord being chosen to locate the feed rollers half the distance between the first frame member and the locator plate whereby the feed rollers are located about the centerline of the cassette when the locator plate contacts the side of the cassette nearest the second frame member regardless of the width of the cassette.

4. An apparatus for automatically positioning a feeding mechanism of a copier relative to sheet material disposed in a cassette so as to advance properly aligned sheet material from the cassette to the copier, which comprises:

means for determining the location of one side portion of the cassette, said determining means being actuated in response to the cassette being loaded into the copier; and means for moving the feeding mechanism in substantially a transverse direction relative to the direction of advancement of the sheet material from the cassette to the copier, said moving means being operated by said determining means so as to position the feeding mechanism at about the centerline of the cassette.

* * * * *